(12) United States Patent
Chao et al.

(10) Patent No.: US 9,091,592 B2
(45) Date of Patent: Jul. 28, 2015

(54) TEMPERATURE-DETECTING SYSTEM AND TEMPERATURE-DETECTING METHOD

(75) Inventors: Chuan-Mu Chao, Taoyuan County (TW); Tung-Yi Hsieh, Taoyuan County (TW)

(73) Assignee: DELTA ELECTRONICS, INC., Tauyuan County (TW)

( * ) Notice: Subject to any disclaimer, the term of this patent is extended or adjusted under 35 U.S.C. 154(b) by 701 days.

(21) Appl. No.: 13/416,958

(22) Filed: Mar. 9, 2012

(65) Prior Publication Data

US 2013/0057683 A1    Mar. 7, 2013

(30) Foreign Application Priority Data

Sep. 7, 2011   (TW) .............................. 100132327 A

(51) Int. Cl.
| H04N 7/18 | (2006.01) |
| G01J 5/02 | (2006.01) |
| G06K 9/00 | (2006.01) |
| H04N 5/33 | (2006.01) |
| G01J 5/00 | (2006.01) |

(52) U.S. Cl.
CPC ............... *G01J 5/025* (2013.01); *G01J 5/0066* (2013.01); *H04N 7/18* (2013.01); *H04N 7/181* (2013.01); *G01J 2005/0048* (2013.01); *G01J 2005/0077* (2013.01); *H04N 5/33* (2013.01)

(58) Field of Classification Search
CPC ........... H04N 7/181; H04N 7/18; H04N 5/33; G01J 5/025; G01J 5/0066; G01J 2005/0048; G01J 2005/0077
See application file for complete search history.

(56) References Cited

U.S. PATENT DOCUMENTS

| 6,396,043 | B1 * | 5/2002 | Glenn et al. ................ 250/208.1 |
| 6,681,057 | B1 * | 1/2004 | Nair et al. ...................... 382/294 |
| 8,121,363 | B2 | 2/2012 | Chiakpo et al. |
| 2005/0024826 | A1 * | 2/2005 | Bash et al. ..................... 361/695 |
| 2009/0113323 | A1 * | 4/2009 | Zhao et al. ..................... 715/764 |
| 2010/0117839 | A1 * | 5/2010 | Lee ................................ 340/577 |
| 2013/0188058 | A1 * | 7/2013 | Nguyen et al. ................ 348/164 |

FOREIGN PATENT DOCUMENTS

| CN | 201935733 U | 8/2011 |
| TW | I237801 B | 8/2005 |
| TW | 201015454 A1 | 4/2010 |

OTHER PUBLICATIONS

TW Office Action dated Oct. 15, 2013 from corresponding TW application, 5 pp.
CN Office Action dated May 5, 2014 from corresponding CN application, 7 pp.

\* cited by examiner

*Primary Examiner* — Joseph Ustaris
*Assistant Examiner* — Jill Sechser
(74) *Attorney, Agent, or Firm* — Muncy, Geissler, Olds & Lowe, P.C.

(57) ABSTRACT

A temperature-detecting system includes a plurality of detected-objects, an infrared image-detecting apparatus arranged corresponding to the detected-objects, and an image-processing apparatus electrically connected to the infrared image-detecting apparatus. The infrared image-detecting apparatus derives a lens-frame image. The locations of the detected-objects required temperature detection in the lens-frame image are obtained by the image-processing apparatus. The color of the locations of the detected-objects required temperature detection in the lens-frame image are analyzed by the image-processing apparatus to derive related temperature data.

20 Claims, 5 Drawing Sheets

TEMPERATURE-DETECTING SYSTEM AND TEMPERATURE-DETECTING METHOD

BACKGROUND OF THE INVENTION

1. Field of the Invention

The present invention relates to a detecting system and a detecting method, and especially relates to a temperature-detecting system and a temperature-detecting method.

2. Description of Prior Art

A data center comprises a lot of computers and machines. The data center needs to handle a lot of data. Therefore, the data center is often overheated if there is no good temperature detection and air condition. The computers and machines in the data center will be damaged easily when the data center is overheated.

The conventional temperature-detecting method for data center is to arrange a plurality of temperature sensors in the air-outlet and air-inlet of the cabinet in the data center. The temperature sensors are cascaded connected to a sensor hub after the temperature sensors are arranged. Therefore, the temperature data detected by the temperature sensors are sent from the temperature sensors to the sensor hub in polling manner.

The disadvantages of the conventional temperature-detecting method mentioned above are as following.

1. The temperature sensors are required, and the layouts of the temperature sensors are required as well. Therefore, the problem of communication interference is raised.
2. The temperature data is not sent instantly because the temperature data detected by the temperature sensors are sent from the temperature sensors to the sensor hub in polling manner.
3. The energy consumption of the temperature sensors exists because the temperature sensors are required.
4. To measure the temperature of a mass of locations is difficult because the temperature sensors are required (the more the temperature sensors, the worse the disadvantages 1-3 mentioned above).

SUMMARY OF THE INVENTION

In order to solve the above-mentioned problems, an object of the present invention is to provide a temperature-detecting system.

In order to solve the above-mentioned problems, another object of the present invention is to provide a temperature-detecting method.

In order to achieve the object of the present invention mentioned above, the temperature-detecting system of the present invention is arranged in a data center to monitor the temperature of the data center. The temperature-detecting system comprises a plurality of detected-objects arranged in a plurality of cabinets in the data center, an infrared image-detecting apparatus arranged corresponding to the detected-objects, and an image-processing apparatus electrically connected to the infrared image-detecting apparatus. The infrared image-detecting apparatus derives a lens-frame image. The locations of the detected-objects required temperature detection in the lens-frame image are obtained by the image-processing apparatus. The color of the locations of the detected-objects required temperature detection in the lens-frame image are analyzed by the image-processing apparatus to derive related temperature data. Moreover, the data corresponding to the shape of an edge of the detected-object is memorized in the image-processing apparatus, so that the lens-frame image is compared by the image-processing apparatus to decide the locations of the detected-objects required temperature detection.

In order to achieve the other object of the present invention mentioned above, the temperature-detecting method of the present invention is applied to a data center to monitor the temperature of the data center. The temperature-detecting method comprises following steps. An infrared image-detecting apparatus derives a lens-frame image. The locations of a plurality of detected-objects required temperature detection in the lens-frame image are obtained by an image-processing apparatus. The color of the locations of the detected-objects required temperature detection in the lens-frame image are analyzed by the image-processing apparatus to derive related temperature data. Moreover, the detected-objects are arranged in a plurality of cabinets in the data center. The data corresponding to the shape of an edge of the detected-object is memorized in the image-processing apparatus, so that the lens-frame image is compared by the image-processing apparatus to decide the locations of the detected-objects required temperature detection.

The efficiency of the present invention is to arrange the temperature-detecting system easily and quickly, and detect the temperature of a mass of detected-points quickly.

DETAILED DESCRIPTION OF THE INVENTION

Figure 1:
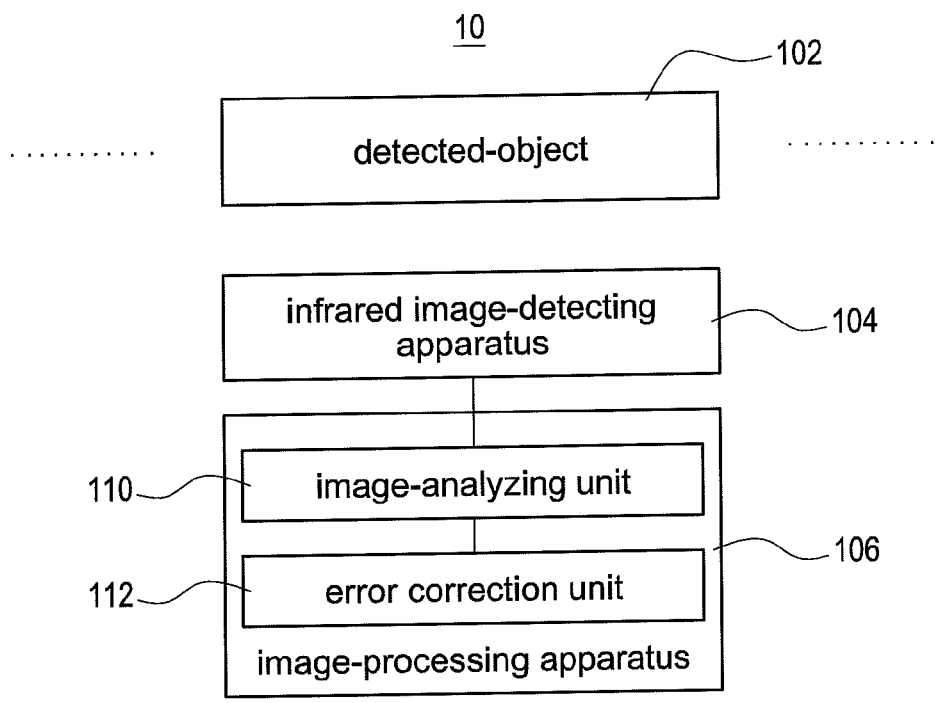
FIG. 1 shows a block diagram of the temperature-detecting system of the present invention.

FIG. 1 shows a block diagram of the temperature-detecting system of the present invention. The temperature-detecting system 10 of the present invention comprises a plurality of detected-objects 102, an infrared image-detecting apparatus 104, and an image-processing apparatus 106. The image-processing apparatus 106 comprises an image-analyzing unit 110 and an error correction unit 112.

In an embodiment, the temperature-detecting system 10 is arranged in a data center 20 to monitor the temperature of the data center 20. The detected-objects 102 are arranged in a plurality of cabinets 202 in the data center 20 (as shown in the FIG. 3).

The infrared image-detecting apparatus 104 is arranged corresponding to the detected-objects 102. The image-processing apparatus 106 is electrically connected to the infrared image-detecting apparatus 104. The image-analyzing unit 110 is electrically connected to the infrared image-detecting apparatus 104. The error correction unit 112 is electrically connected to the image-analyzing unit 110.

The error correction unit 112 is used to set the parameters of the error correction, so that effects caused by differences among the detected-objects 102 are reduced. The infrared image-detecting apparatus 104 could be an infrared camera.

Figure 2:
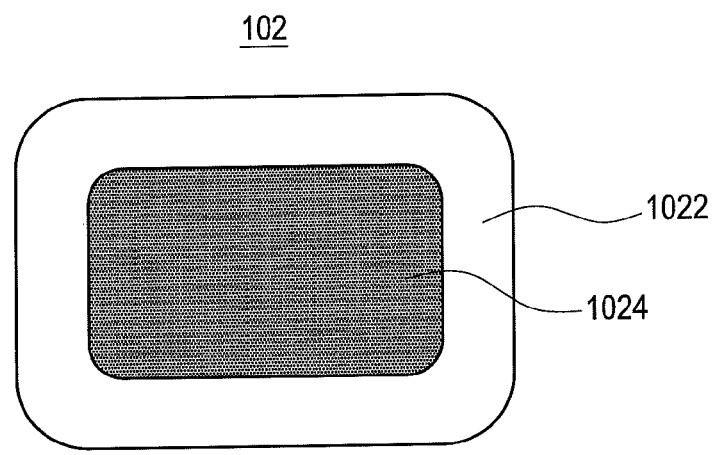
FIG. 2 shows a diagram of an embodiment of the detected-object.

FIG. 2 shows a diagram of an embodiment of the detected-object. The substrate of an edge 1022 of the detected-object 102 is a reflective substrate (for example a glass or an acrylic), so that the location of the detected-object 102 is recognized easily. The substrate of an inner 1024 of the detected-object 102 is a substrate which manifests the temperature of the environment (for example an electrical tape), so that the temperature of the environment is manifested by the detected-object 102 easily.

Figure 3:
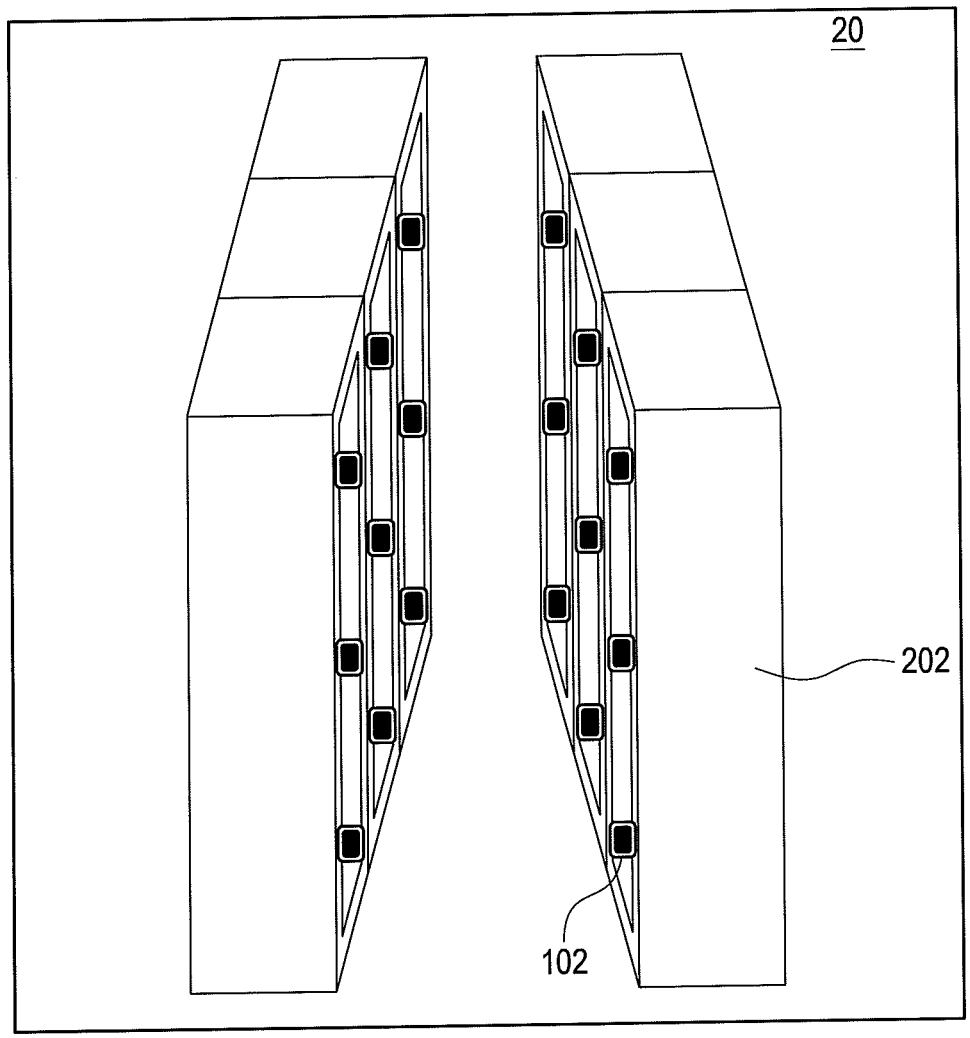
FIG. 3 shows a diagram of an embodiment of the lens-frame image.

Firstly, the infrared image-detecting apparatus 104 derives a lens-frame image. FIG. 3 shows a diagram of an embodiment of the lens-frame image. Two rows of the cabinets 202 and the detected-objects 102 are shown in the lens-frame image derived by the infrared image-detecting apparatus 104.

Then, the locations of the detected-objects 102 required temperature detection in the lens-frame image are obtained by the image-processing apparatus 106. For example, a user watches the monitor of the infrared image-detecting apparatus 104, and selects the locations of the detected-objects 102 required temperature detection in the lens-frame image. Or for example, the data corresponding to the shape of the edge 1022 of the detected-object 102 is memorized in the image-processing apparatus 106, so that the lens-frame image is compared by the image-processing apparatus 106 to decide the locations of the detected-objects 102 required temperature detection.

Finally, the color of the locations of the detected-objects 102 required temperature detection in the lens-frame image are analyzed by the image-processing apparatus 106 to derive related temperature data.

Before the image-processing apparatus 106 is turned off, the locations of the detected-objects 102 required temperature detection in the lens-frame image will be memorized in the image-processing apparatus 106. When the image-processing apparatus 106 is re-turned on, the image-processing apparatus 106 analyzes the color according to the memorized locations of the detected-objects 102 required temperature detection in the lens-frame image. In this way, when the image-processing apparatus 106 is re-turned on, the analyzed locations of the color in order to derive the relative temperature data will be the same as the locations memorized in the image-processing apparatus 106.

A caution is sent out from the image-processing apparatus 106 if the actually detected locations of the detected-objects 102 required temperature detection are different from the setting locations memorized in the image-processing apparatus 106. For examples, a new detected-object 102 is added, or anyone of the detected-objects 102 is removed, or anyone of the detected-objects 102 is moved too much. A buzzer or a light-emitting diode could be arranged in the image-processing apparatus 106 to send out the caution.

Figure 5:
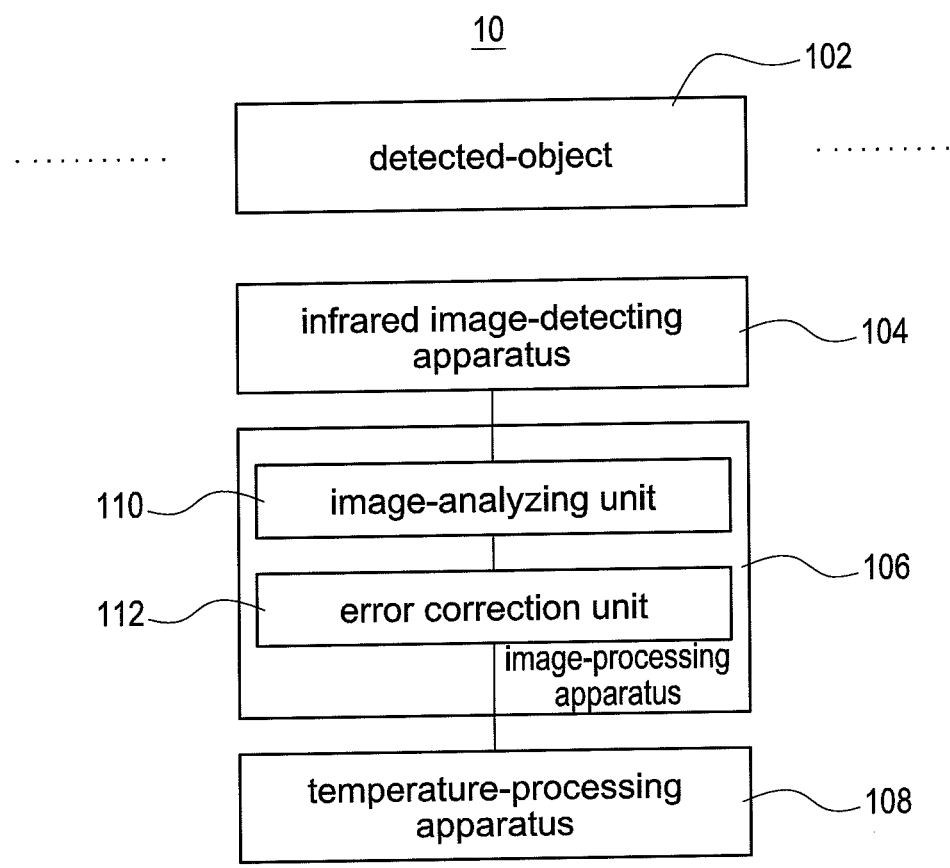
FIG. 5 shows a block diagram of another embodiment of the temperature-detecting system of the present invention.

FIG. 5 shows a block diagram of another embodiment of the temperature-detecting system of the present invention. The temperature-detecting system 10 of the present invention comprises a plurality of detected-objects 102, an infrared image-detecting apparatus 104, an image-processing apparatus 106, and a temperature-processing apparatus 108. The image-processing apparatus 106 comprises an image-analyzing unit 110 and an error correction unit 112.

The advantages of the temperature-detecting system 10 of the present invention are as following.

1. It is easy to arrange because the temperature sensors are not required, and the layouts of the temperature sensors are not required, either. Therefore, there is no problem of communication interference.

2. The temperature data is derived real-time because the temperature of all of the detected-objects 102 will be analyzed by the image-processing apparatus 106 in a short time.

3. The energy consumption of the temperature sensors does not exist because the temperature sensors are not required.

4. It is able to measure the temperature of a mass of locations.

Figure 4:
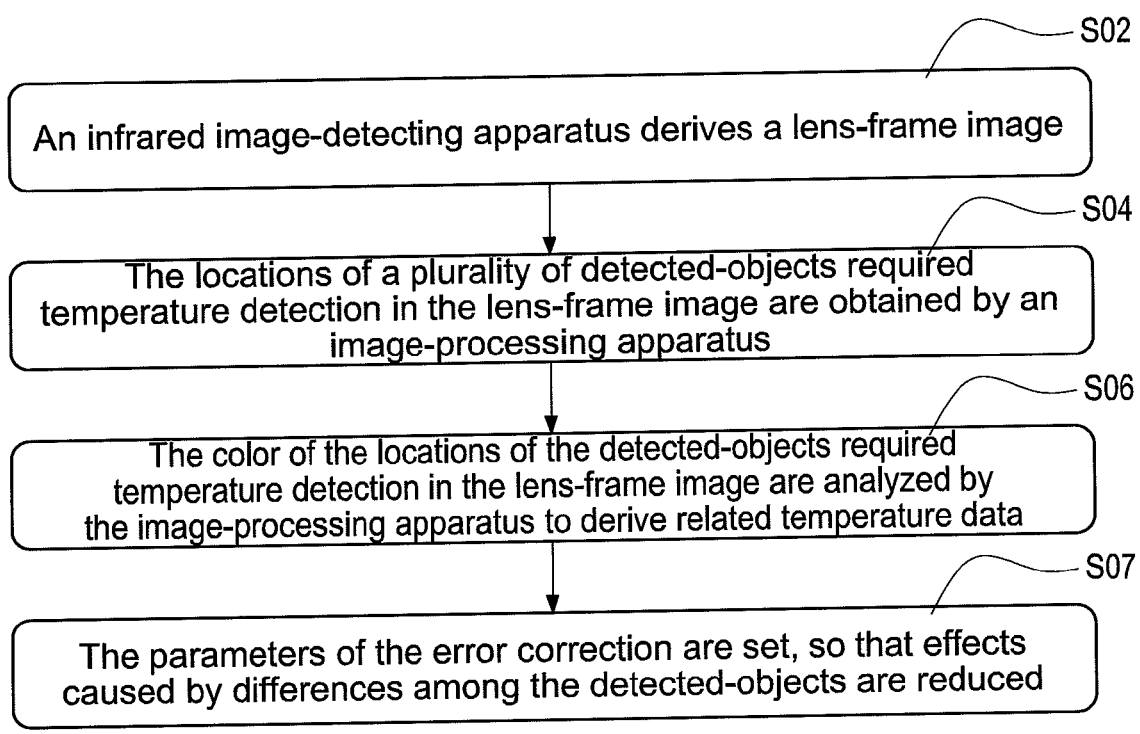
FIG. 4 shows a flow chart of the temperature-detecting method of the present invention.

FIG. 4 shows a flow chart of the temperature-detecting method of the present invention. The temperature-detecting method of the present invention comprises following steps.

S02: An infrared image-detecting apparatus derives a lens-frame image. FIG. 3 shows a diagram of an embodiment of the lens-frame image.

S04: The locations of a plurality of detected-objects required temperature detection in the lens-frame image are obtained by an image-processing apparatus. For example, a user watches the monitor of the infrared image-detecting apparatus, and selects the locations of the detected-objects required temperature detection in the lens-frame image. Or for example, the data corresponding to the shape of an edge of the detected-object is memorized in the image-processing apparatus, so that the lens-frame image is compared by the image-processing apparatus to decide the locations of the detected-objects required temperature detection.

S06: The color of the locations of the detected-objects required temperature detection in the lens-frame image are analyzed by the image-processing apparatus to derive related temperature data.

S07: The parameters of the error correction are set, so that effects caused by differences among the detected-objects are reduced.

In an embodiment (refer to FIG. 1 and FIG. 3), the temperature-detecting method is applied to a data center 20 to monitor the temperature of the data center 20. The detected-objects 102 are arranged in a plurality of cabinets 202 in the data center 20. The infrared image-detecting apparatus 104 could be an infrared camera.

Figure 6:
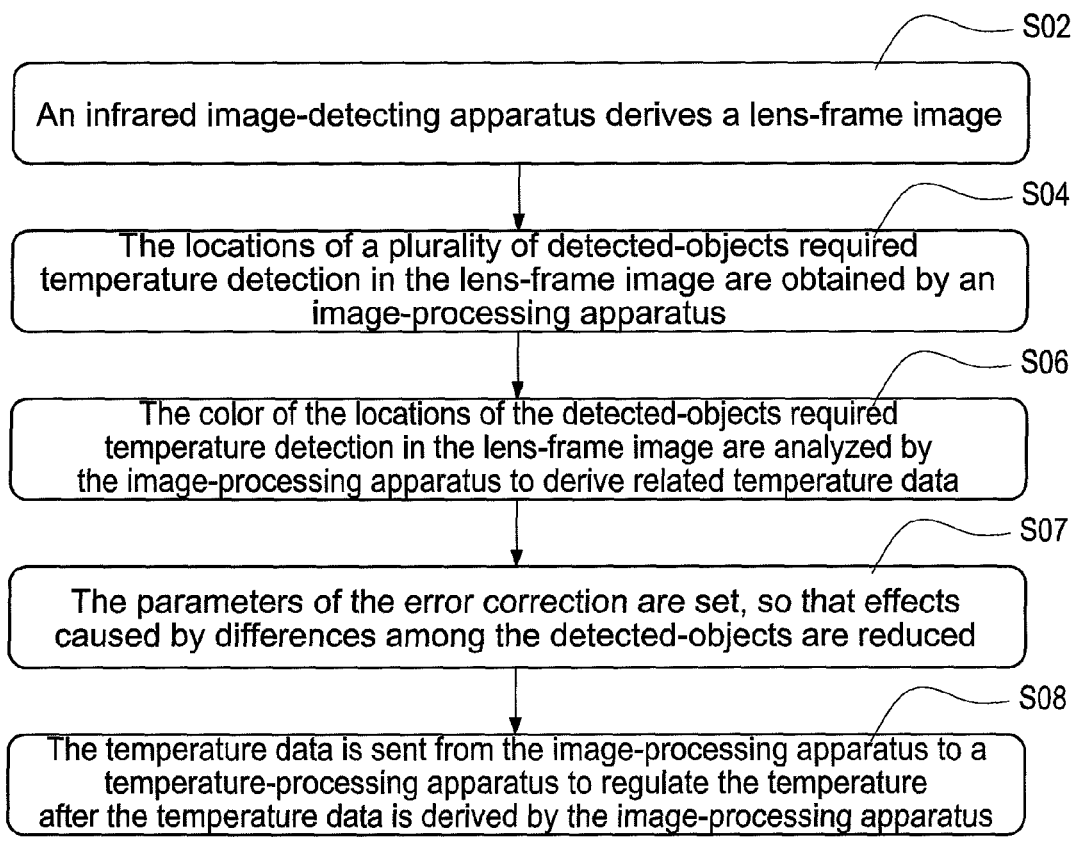
FIG. 6 shows a flow chart of another embodiment of the temperature-detecting method of the present invention.

FIG. 6 shows a flow chart of another embodiment of the temperature-detecting method of the present invention. The temperature-detecting method of the present invention comprises following steps.

S02: An infrared image-detecting apparatus derives a lens-frame image. FIG. 3 shows a diagram of an embodiment of the lens-frame image.

S04: The locations of a plurality of detected-objects required temperature detection in the lens-frame image are obtained by an image-processing apparatus. For example, a user watches the monitor of the infrared image-detecting apparatus, and selects the locations of the detected-objects required temperature detection in the lens-frame image. Or for example, the data corresponding to the shape of an edge of the detected-object is memorized in the image-processing apparatus, so that the lens-frame image is compared by the image-processing apparatus to decide the locations of the detected-objects required temperature detection.

S06: The color of the locations of the detected-objects required temperature detection in the lens-frame image are analyzed by the image-processing apparatus to derive related temperature data.

S07: The parameters of the error correction are set, so that effects caused by differences among the detected-objects are reduced.

S08: The temperature data is sent from the image-processing apparatus to a temperature-processing apparatus to regulate the temperature after the temperature data is derived by the image-processing apparatus. For example, if the temperature of the detected-objects in somewhere is too high, the temperature over there will be cooled down by the air conditioner.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A temperature-detecting system arranged in a data center to monitor the temperature of the data center, the temperature-detecting system comprising:
   a plurality of detected-objects arranged in a plurality of cabinets in the data center, all of the detected-objects having the same shape;
   an infrared image-detecting apparatus arranged corresponding to the detected-objects, the infrared image-detecting apparatus shooting all of the detected-objects at the same time; and
   an image-processing apparatus electrically connected to the infrared image-detecting apparatus,
   wherein the infrared image-detecting apparatus derives a lens-frame image; wherein the lens-frame image comprises the locations of all of the detected-objects; wherein in the lens-frame image, the locations of some of the detected-objects are selected to detect temperature while the locations of the other detected-objects are not required to detect temperature; wherein the locations of the detected-objects required temperature detection in the lens-frame image are obtained by the image-processing apparatus; wherein only the color of the locations of the detected-objects required temperature detection in the lens-frame image are analyzed by the image-processing apparatus to derive related temperature data; wherein the data corresponding to the shape of an edge of the detected-object is memorized in the image-processing apparatus, so that the lens-frame image is compared by the image-processing apparatus to decide the locations of the detected-objects.

2. The temperature-detecting system in claim 1, wherein the image-processing apparatus comprises an image-analyzing unit electrically connected to the infrared image-detecting apparatus.

3. The temperature-detecting system in claim 2, wherein the image-processing apparatus further comprises an error correction unit electrically connected to the image-analyzing unit, wherein the error correction unit is used to set the parameters of the error correction, so that effects caused by differences among the detected-objects are reduced.

4. The temperature-detecting system in claim 3, wherein the substrate of the edge of the detected-object is a reflective substrate.

5. The temperature-detecting system in claim 4, wherein the substrate of an inner of the detected-object is a substrate which manifests the temperature of the environment.

6. The temperature-detecting system in claim 5, wherein the reflective substrate is a glass or an acrylic, and wherein the substrate which manifests the temperature of the environment is an electrical tape, wherein the infrared image-detecting apparatus is an infrared camera.

7. The temperature-detecting system in claim 6, wherein when the image-processing apparatus is re-turned on, the image-processing apparatus analyzes the color according to the locations of the detected-objects required temperature detection in the lens-frame image memorized before previous turn-off to derive related temperature data.

8. The temperature-detecting system in claim 7, wherein a caution is sent out from the image-processing apparatus if the actually detected locations of the detected-objects required temperature detection are different from the setting locations memorized in the image-processing apparatus.

9. The temperature-detecting system in claim 8, further comprising a temperature-processing apparatus electrically connected to the image-processing apparatus.

10. The temperature-detecting system in claim 9, wherein the temperature-processing apparatus is an air conditioner or an exhaust fan.

11. A temperature-detecting method applied to a data center to monitor the temperature of the data center, the temperature-detecting method comprising following steps:
    a. deriving a lens-frame image by an infrared image-detecting apparatus;
    b. obtaining the locations of a plurality of detected-objects required temperature detection in the lens-frame image by an image-processing apparatus; and
    c. only analyzing the color of the locations of the detected-objects required temperature detection in the lens-frame image by the image-processing apparatus to derive related temperature data,
    wherein the detected-objects are arranged in a plurality of cabinets in the data center; wherein in the step b, the data corresponding to the shape of an edge of the detected-object is memorized in the image-processing apparatus, so that the lens-frame image is compared by the image-processing apparatus to decide the locations of the detected-objects; wherein all of the detected-objects have the same shape; wherein in the step a, the infrared image-detecting apparatus shoots all of the detected-objects at the same time; wherein in the step a, the lens-frame image comprises the locations of all of the detected-objects; wherein in the step a, in the lens-frame image, the locations of some of the detected-objects are selected to detect temperature while the locations of the other detected-objects are not required to detect temperature.

12. The temperature-detecting method in claim 11, wherein the substrate of the edge of the detected-object is a reflective substrate.

13. The temperature-detecting method in claim 12, wherein the substrate of an inner of the detected-object is a substrate which manifests the temperature of the environment.

14. The temperature-detecting method in claim 13, wherein the reflective substrate is a glass or an acrylic, and wherein the substrate which manifests the temperature of the environment is an electrical tape.

15. The temperature-detecting method in claim 14, wherein the infrared image-detecting apparatus is an infrared camera.

16. The temperature-detecting method in claim 15, further comprising:
    d. setting the parameters of the error correction, so that effects caused by differences among the detected-objects are reduced.

17. The temperature-detecting method in claim 16, wherein when the image-processing apparatus is re-turned on, the image-processing apparatus analyzes the color according to the locations of the detected-objects required temperature detection in the lens-frame image memorized before previous turn-off to derive related temperature data.

18. The temperature-detecting method in claim 17, wherein a caution is sent out from the image-processing apparatus if the actual detected locations of the detected-objects required temperature detection are different from the setting locations memorized in the image-processing apparatus.

19. The temperature-detecting method in claim 18, further comprising:
   e. the image-processing apparatus sending the temperature data to a temperature-processing apparatus to regulate the temperature after the temperature data is derived by the image-processing apparatus.

20. The temperature-detecting method in claim 19, wherein the temperature-processing apparatus is an air conditioner or an exhaust fan.

* * * * *